May 9, 1950     G. E. HALLENBECK     2,506,958
MACHINE TOOL
Filed Nov. 7, 1945
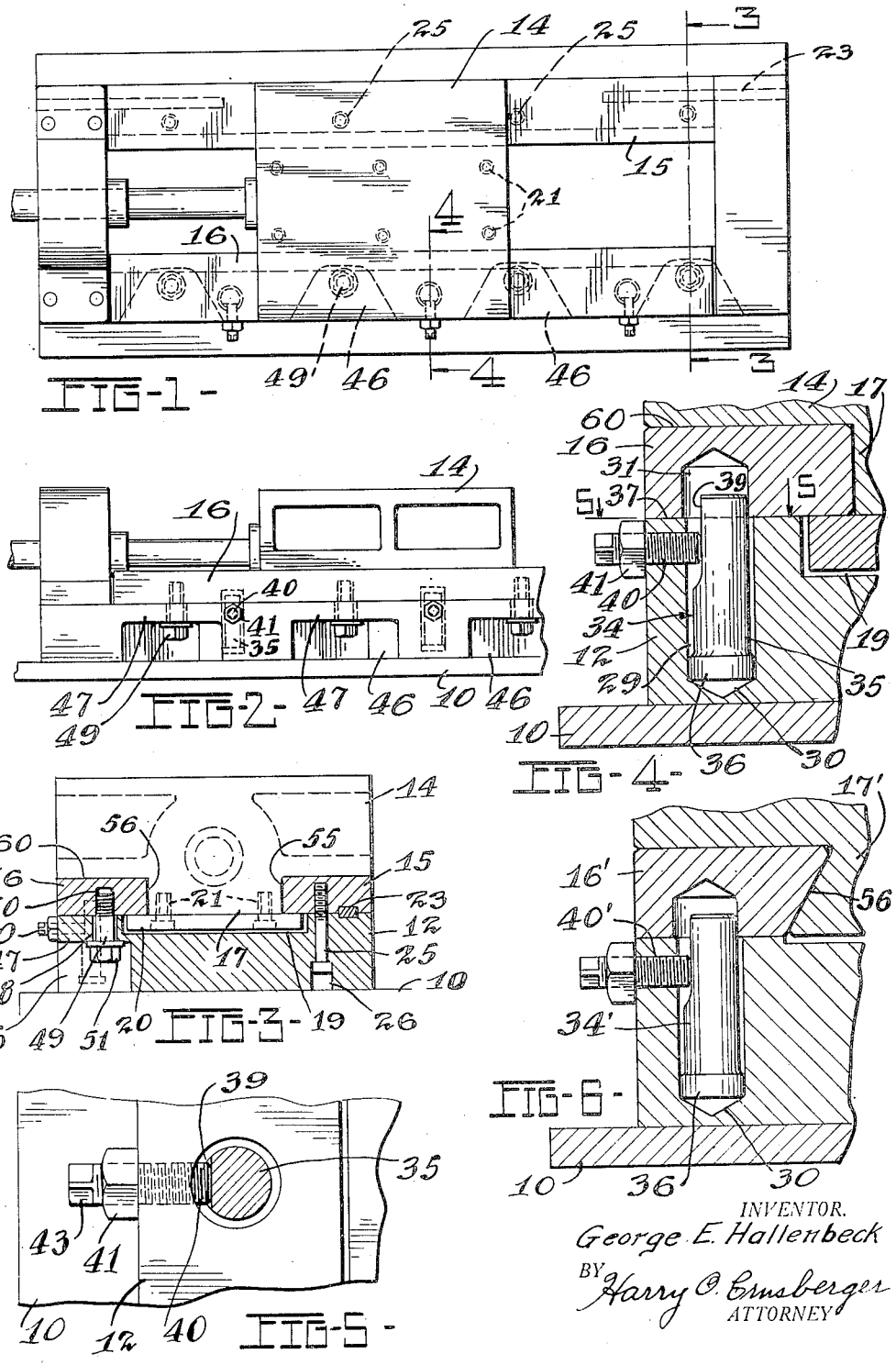
INVENTOR.
George E. Hallenbeck
BY Harry O. Ernsberger
ATTORNEY Patented May 9, 1950

2,506,958

UNITED STATES PATENT OFFICE 2,506,958

MACHINE TOOL

George E. Hallenbeck, Toledo, Ohio, assignor to Baker Bros., Inc., Toledo, Ohio, a corporation of Ohio Application November 7, 1945, Serial No. 627,160

5 Claims. (Cl. 308—3)

This invention relates to machine tools and more particularly to sliding bearings for relatively movable elements of machine tools.

The invention comprehends the provision of a sliding bearing construction for a slidable machine element wherein a way or gib is provided with improved adjusting means whereby the way or gib may be quickly and easily adjusted and locked in proper position.

The invention embraces an adjustable gib construction for a sliding bearing of a machine tool wherein the gib adjusting and locking means are easily and quickly accessible exteriorly of the machine bed or frame construction and whereby a maximum of sliding bearing surface is obtained between the relatively movable machine element and the adjustable gib or way.

An object of the invention resides in the provision of an adjustable gib construction for the sliding bearings of movable machine elements wherein the gib is moved transversely by means of lever elements, the latter being acted upon by an adjusting means which may be securely locked in adjusted position in conjunction with independent means for locking gib to the bed plate of the machine.

Another object of the invention is the provision of a sliding bearing construction for relatively slidable machine elements in which a bar or gib is rendered transversely adjustable by means accessible exteriorly of the bearing construction and adjacent elements whereby a simple yet effective adjustment and locking means for the gib is attained with a minimum dimension for the sliding bearing construction and at the same time attaining a maximum bearing surface for the relatively slidable element.

Still another object of the invention lies in an adjusting and locking means for an adjustable bearing member for a sliding bearing wherein an adjusting and locking means are so arranged that the full upper and lateral surfaces of the adjustable bearing member present uninterrupted surfaces for obtaining a maximum bearing area for supporting the relatively slidable machine element.

Still a further object of the invention is the provision of a way or block forming a bearing surface for supporting a slidable machine element in which the way is arranged for transverse adjustment to regulate the amount of clearance for the slidable element.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawing of a form of the invention, which may be preferred, in which:

Figure 1 is a top plan view of a machine tool bed or frame construction embodying the sliding bearing arrangement of my invention for a relatively movable machine element;

Figure 2 is a side elevational view of a portion of the construction shown in Figure 1;

Figure 3 is a transverse sectional view taken substantially on the line 3—3 of Figure 1;

Figure 4 is a detail sectional view taken substantially on the line 4—4 of Figure 1;

Figure 5 is a fragmentary detail sectional view taken substantially on the line 5—5 of Figure 4; and Figure 6 is a view similar to Figure 4 illustrating a modified form of sliding bearing and gib construction.

While the forms of my invention are illustrated as associated with a horizontally slidable machine element construction, it is to be understood that I contemplate the utilization of the arrangement of my invention with a vertically movable structure or any other adaptation where the invention may be found to have utility.

Referring to the drawings in detail and first with respect to the form shown in Figures 1 through 5 inclusive, the numeral 10 indicates a bed plate of a machine. Supported upon plate 10 is a block 12 forming a component of the bed of the machine with which is associated a sliding bearing construction for a relatively slidable carriage or machine element 14. The block 12 supports longitudinally extending members or ways 15 and 16 which are spaced to accommodate a depending tang 17 formed upon the slidable machine element or slide 14. The block 12 is provided with a longitudinally extending recess as at 19 to accommodate a retaining plate or strip 20 which is fixedly secured to the tang 17 of the carriage or slide by means of cap screws 21 as shown in Figure 3. The plate 20 extends laterally beyond the tang 17 to underlie portions of the ways 15 and 16 as shown in Figure 3 in order to prevent vertical movement of the machine element 14.

The member or way 15 is preferably stationary in character. The lower surface of way 15 and the upper adjacent surface of block or machine bed 12 are respectively formed with longitudinally extending slots in which is fitted a key or bar 23 serving to maintain element 15 and the block 12 in proper aligned relationship. The way or member 15 is provided with spaced threaded openings which are in registration with openings in the block 12 to accommodate securing means in the form of cap screws 25, as particularly shown in Figures 1 and 3. The heads of cap screws extend into suitable counter bores 26 formed in the lower part of the block 12.

The way element or gib 16 is arranged to be shifted or adjusted laterally so that the tang 17 of the slide is permitted sufficient clearance to be readily slidable in a longitudinal direction but without appreciable transverse clearance which must be reduced to a minimum as excessive clearance would seriously interfere with or reflect upon the accuracy of the work upon which machining operations may be performed. Adjustability of member 16 is necessary to compensate for any wear of the engaging surfaces of the members 15, 16 and the tang 17. To this end the supporting block 12 is formed with a plurality of longitudinally spaced cylindrical recesses or bores 29 which are closed at their lower ends by conically shaped configurations 30 which may be formed by reason of the reciprocally shaped extremity of the drill or tool used in forming the bores 29. The gib or member 16 is also provided with a plurality of spaced cylindrical bores 31 which are in alignment in transverse planes passing through the bores 29, but the axes of bores 31 are slightly out of registration with the axes of bores 29 as shown in Figure 4 for purposes to be hereinafter explained.

Each of the bores 29 is adapted to receive and accommodate a member 34 which is formed with a generally cylindrical portion 35 of a diameter leess than the diameter of a bore 29. Each member 34 is formed at its lower end with an enlarged head portion or flange 36 of a diameter sufficient to snugly, yet slidably engage in the bore 29 and rest upon the periphery of the bottom wall defining the cone shape 30. The portion 35 of each of members 34 extends above the upper surface 37 of the block 12 and partially into recesses 31 formed in the gib or way 16. As shown in Figure 4, the upper portion of member 34 engages an inner wall of bore 31 in the direction toward the tang 17.

Each of the portions 35 of members 34 is formed with a flattened surface 39, each surface 39 being arranged to be engaged by the extremity of an adjusting means or screw 40, which is threaded into a transversely extending threaded opening in the wall portion of block 12 as shown in Figures 4 and 5. Each of the screws 40 is adapted to receive a nut 41 for locking screw 40 in its adjusted position. The outer extremity of each of the screws 40 is provided with a polygonal portion 43 adapted to receive a wrench or other suitable tool for rotating the screw 40.

The portion of block 12 beneath the adjustable gib 16 is configurated with a plurality of spaced recesses 46 providing a ledge 47 bounding the upper terminous of each recess 46. Each ledge 47 is provided with a vertical opening or bore 48 to accommodate a locking means in the form of a screw 49, the threaded portion of each of the screws 49 projecting into a threaded opening 50 in the member 16. Each of the screws 49 is provided with a polygonal head 51 for manipulating the same. It will be noted from Figure 3 that each of the bores 48 in ledges 47 of block 12 is of a larger diameter than the diameter of each of the screws 49 so as to provide for lateral or transverse movement of gib or member 16 relative to block 12, this transverse adjustment being attained by manipulation of the screws 40.

The proper adjustment of the innermost surfaces of gibs or ways 15 and 16 in engagement with the vertical surfaces 55 and 56 of tang 17 may be secured by adjustment of the way 16 so that the proper clearance for smooth sliding movement of the element 14 with respect to the ways 15 and 16 and the block 12 may be attained. It should be noted that if there is any wear of the vertical surfaces 55 and 56 of the tang 17 or the adjacent surfaces of the ways 15 and 16 that this wear may be compensated for by adjusting the gib or way 16.

The adjustment of gib 16 is obtained in the following manner; The locking means or screws 49 are normally drawn tightly in order to lock gib 16 to the upper surface of block 12 and ledge portions 47. In order to adjust the gib 16, the machine operator loosens or backs off the screws 49 by application of a proper tool or wrench to the polygonal heads 51 thereof. After the gib 16 has been loosened, the operator backs off each of the lock nuts 41 on screws 40 so that the latter may be moved by application of a suitable tool or wrench applied to the polygonal portions 43 of the screws 40. Assuming for example, that it is desired to move the adjustable gib 16 toward the tang 17 to eliminate some of the clearance between tang 17 and gibs 15 and 16, the operator manipulates each of the screws 40, turning same in a clockwise direction, which motion tilts the members 34 toward the tang 17, the upper end portions of members 34 engaging the inner walls of the recesses 31 in the gib 16, moving the latter toward the tang 17. During this operation, the head portion 36 of each of the members 34 acts against the lower wall portion of bore 29 as a fulcrum so that the members 34 in effect become levers acting at the upper ends to move the gib 16 toward the tang 17 under the application of force through the medium of screws 40. It will be noted that each of the bores 29 is sufficiently large to accommodate reasonable tilting movement of members 34 sufficient to adjust the gib 16 for wear of the engaging surfaces of the tang 17 and the gibs or ways 15 and 16, as well as to obtain the required clearance when the machine elements are first assembled. After this adjustment of members 40 has been made, the screws 40 are locked in position by drawing up the lock nuts 41, the gib or way 16 is then locked against movement in any direction by again drawing up the screws 49 so as to secure the gib 16 in engagement with the upper surface of block 12.

It should be noted that the member 16 performs a twofold purpose and provides a combined way and adjustable gib construction. It functions as a guide or way for the carriage or slide 14 as the upper surface 60 of member 16 provides a uniplaner surface in conjunction with that of the way 15 for supporting the slide. It also functions as an adjustable gib for determining the proper clearance for the slide without the use of an independent element as has been the practice heretofore.

It should be noted that the gib or way locking means may be manipulated and the adjusting means rendered readily accessible exteriorly of the machine so that adjustments may be quickly and easily made without interfering with any of the other mechanisms or component parts of the machine. Furthermore this type of adjustment occupies a minimum space and less metal therefore required for the fabrication of the block 12 than has been heretofore possible. Moreover by applying the gib locking means beneath the gib, the upper surface 60 thereof provides a comparatively large uninterrupted bearing surface area for contact with a reciprocal surface on the slide 14, so that wear of the contacting surfaces of the relatively stationary and slidable members is reduced to a minimum.

Figure 6 illustrates a modified form of gib and tang construction of the carriage illustrating the application of the adjusting means of my invention as applied thereto. In this form of the invention the tang 17' is provided with a dove-tail configuration, that is, the lateral surface 56 is of a downwardly diverging angle which mates with a corresponding angularly disposed surface on the inner surface portion of the adjustable way or gib 16'. In this form of tang and gib construction, the plate 20 may be eliminated, as the function of plate 20 is performed through the angularly disposed interengaging surfaces of the tang 17' and the ways. In this form of the invention, manipulation of levers or members 34' is obtained by adjustment of screws 40' in the same manner as the form of the invention illustrated in Figures 1 through 5 inclusive. It is to be understood that in this form of construction the opposite surface corresponding to surface 55 in the first form of the invention is of a corresponding diverging angularity to that of the surface 56 so that there is a wedging action between the gibs and the tang 18 whereby lateral clearance may be adjusted by adjusting the gib 16', and at the same time the tang 17' is restricted from vertical movement by reason of the angular surfaces of the tang engaging the angular lateral surfaces of the gibs or ways.

It is apparent that within the scope of the invention, modifications and different arrangements may be made other than is herein disclosed, and the present disclosure is illustrative merely, the invention comprehending all variations thereof.

What I claim is:

1. In combination, a pair of elements; one of said elements being slidable with respect to the other of said elements; a gib carried by one of said elements and engageable with the other of said elements for determining the amount of clearance between said elements; one of said elements and said gib having a plurality of cylindrical openings; plungers disposed in the openings in said element and said gib whereby movement of said plungers shifts the relative position of said gib; threaded members engageable with said plungers for tilting said plungers, and means including a second set of threaded members for locking said gib in fixed relation to one of said elements.

2. In combination, a machine bed; an element slidable along said machine bed; a pair of ways associated with said bed for guiding said element during slidable movements thereof; one of said ways being adjustable with respect to said slidable element for determining the amount of clearance between said element and said ways; a plurality of cylindrical bores formed in said machine bed; a cylindrically shaped member having an enlarged head portion disposed in each of said bores; said members projecting above said bed and engaging said adjustable way; means engageable with said cylindrical members intermediate the ends thereof for effecting tilting movement of said members to shift the position of said adjustable way, and means including a plurality of bolts engageable with said adjustable way and accessible exteriorly of said machine bed for locking said way in adjusted position.

3. In combination, a stationary element; a carriage slidable along said element; a pair of ways associated with said stationary element for guiding said carriage; one of said ways being adjustable with respect to the carriage for determining the amount of clearance between said carriage and said ways; said stationary elements having a plurality of cylindrical bores formed therein; cylindrical members having body portions of lesser diameter than the bores and disposed therein; said members having head portions bottomed in said bores and forming fulcrums for tilting movement of said members; the body portions of said members extending above and engageable with said adjustable way; threaded members supported in threaded openings in said stationary elements and engageable with said cylindrical members to effect tilting movement thereof to shift the position of said adjustable way; said stationary element being formed with a plurality of spaced recesses forming ledges, and bolts projecting through openings in said ledges and into threaded openings in said adjustable way for locking the latter to said stationary element.

4. In combination, a pair of elements; one of said elements being slidable with respect to the other of said elements; a gib carried by one of said elements and engageable with the other of said elements for determining the amount of clearance between said elements; one of said elements and said gib having a plurality of openings formed therein; plungers disposed in the openings in said element and gib whereby movement of said plungers shifts the relative position of said gib; means engageable with said plungers intermediate the ends thereof for effecting tilting movement of the plungers to shift the position of said gib, and means for locking said gib in fixed relation to one of said elements.

5. In combination, a pair of elements; one of said elements being slidable with respect to the other of said elements; a gib carried by one of said elements and engageable with the other of said elements for determining the amount of clearance between said elements; one of said elements and said gib having a plurality of recesses formed therein; plungers disposed in the recesses in said element and gib whereby movement of said plungers shifts the relative position of said gib; threaded members engageable with said plungers for effecting tilting movement of the plungers to shift the position of the gib; and means for locking said gib in fixed relation to the element carrying the gib.

GEORGE E. HALLENBECK.

REFERENCES CITED

The following references are of record in the file of this patent:

UNITED STATES PATENTS

| Number | Name | Date |
| --- | --- | --- |
| 206,648 | Tucker | July 30, 1878 |
| 555,372 | Hall | Feb. 25, 1896 |
| 1,804,187 | Terry, Jr. | May 5, 1931 |
| 2,289,874 | Curtis | July 14, 1942 |
| 2,340,450 | Bouschor | Feb. 1, 1944 |